July 1, 1941. N. L. WILLER 2,247,933
PANEL MOUNTING
Filed July 11, 1938
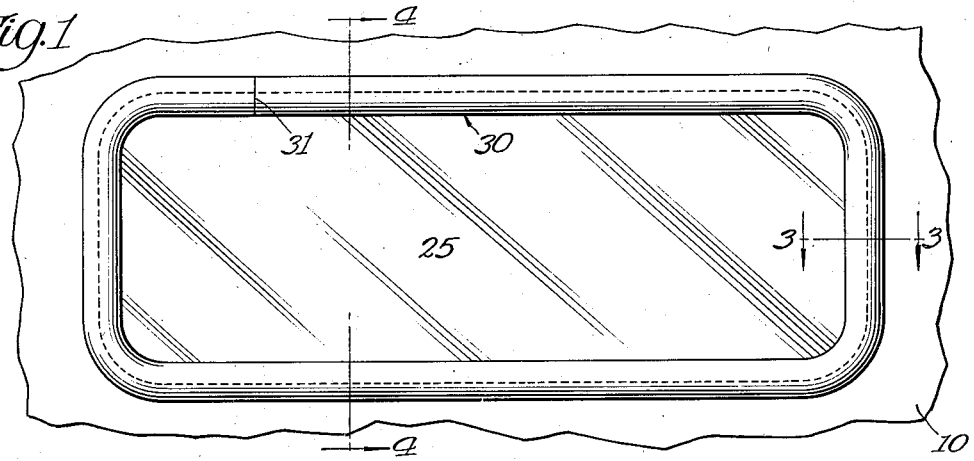
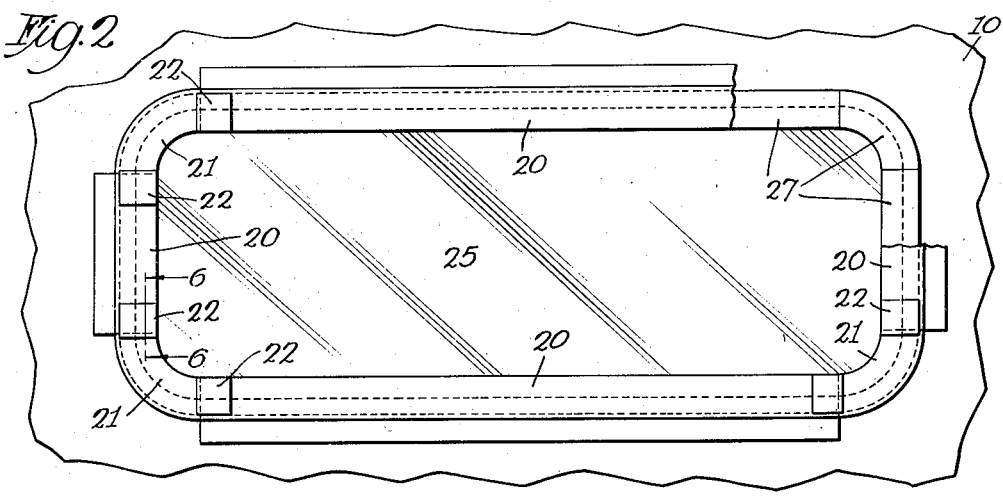
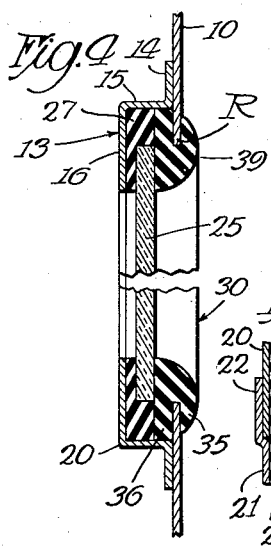
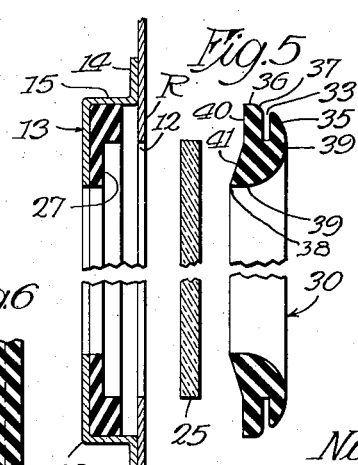
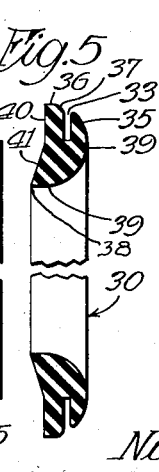
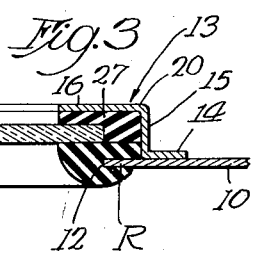
Inventor
Nicholas L. Willer
By Frank H. Marks,
Atty.

Patented July 1, 1941

2,247,933

UNITED STATES PATENT OFFICE 2,247,933

PANEL MOUNTING

Nicholas L. Willer, Chicago, Ill., assignor to Railway Utility Company, Chicago, Ill., a corporation of Illinois Application July 11, 1938, Serial No. 218,715

5 Claims. (Cl. 189—78)

My invention relates to the mounting of panels and is especially applicable to the mounting of glass panels, as, for example, in windows and signs, and more particularly in vehicles such as auto buses, street and railway cars, automobiles, etc.

An object of my invention is to provide a mounting arrangement for panels which will be simple and inexpensive in construction, weatherproof, easy to assemble and to disassemble for repair, which will be secure despite great vibration, and which, in general, will be entirely satisfactory for the purposes desired.

Various other objects and advantages will suggest themselves to those skilled in the art as the description proceeds.

Referring to the drawing forming a part of this specification and illustrating a preferred embodiment of my invention, in which:

Fig. 1 is a front plan view of a panel mounted in accordance with my invention, with a fragmentary portion of the frame therefor;

Fig. 2 is a similar view taken from the rear, with parts broken away;

Figs. 3 and 4 are sectional views taken substantially along the lines 3—3 and 4—4, respectively, of Fig. 1;

Fig. 5 is a disassembled view of the various parts comprising my improved panel mounting, and Fig. 6 is a sectional view taken along the line 6—6 of Fig. 2.

In the embodiment shown, numeral 10 represents a suitable frame, which in this case is represented as a sheet of metal but which may be formed of other suitable material. It should be understood that the embodiment shown and described herein illustrates an arrangement for mounting a panel in a vehicle such as an auto bus.

The frame 10 has an opening 12 therein in which a panel is to be mounted and in the embodiment shown this opening 12 is of generally rectangular shape having its corners rounded. Adjacent the opening 12 there is secured to the back of the frame a retaining member 13, which in this case is preferably of metal and is secured to the frame 10 as by means of spot welding, brazing, or the like. The retaining member 13 has a leg 14 secured contiguous to the frame 10 and set back from the edge thereof to form an inwardly extending rim R. The retaining member also has a leg 15 extending away from the frame 10 and a leg 16 which lies substantially parallel to the frame 10 and the leg 14 and extends beyond the rim R of the frame so as to overlap said edge, thus forming a channel between the leg 16 and the rim portion R of the frame 10.

The retaining member 13 may be formed in one or a plurality of parts. In the preferred embodiment shown are employed separate straight portions 20 for the sides of the opening and rounded portions 21 for the corners thereof, said corner portions having ears 22 extending in prolongation of the leg 16 from each end of the corner portions and these extensions or ears 22 overlapping and being secured as by welding or the like to the legs 16 of the adjacent straight retaining members 20, as seen clearly in Figs. 2 and 6.

Disposed within the opening 12 is a panel 25 which in the embodiment shown is of glass. It will be noted that this panel is of substantially the same shape and size as the opening 12, being of rectangular shape with rounded corners. Being of approximately the same size as, or slightly smaller than, the opening 12, it may be set into the frame after the retaining member 13 has been secured to the frame. The panel 25 is seated against a retaining strip 27 which may be formed of any suitable resilient material such as rubber, felt, fiber, etc. The retaining strip 27 may be formed of a continuous strip of material or may be formed in a plurality of parts. I find it convenient to use separate strips for the straight portions and separate pieces for the corners, the latter conforming in length substantially to the corner parts 21 of the retaining member 13. The backing strip, as seen best in Figs. 3, 4 and 5, is approximately L-shaped in cross section to form a rectangular seat for the panel 25, one portion of the strip being disposed between the edge of the panel and the leg 15 of the retaining member and another portion of the strip being disposed between the panel and the leg 16 of the retaining member.

Forwardly of the panel 25 there is provided a dam member 30, which also may be formed of any suitable resilient material and is preferably of rubber or rubber composition. The dam member 30 is preferably formed in a single continuous strip having its ends abutting each other as at 31. Inasmuch as the dam 30 is on the outside or weather side of the frame, it is, of course, desirable that a perfect seal against the passage of moisture from the outside of the frame to the inside thereof be provided.

The dam has a relatively narrow groove 33 seating the rim R of the frame, a lip portion 35 which overhangs the rim of the frame, a tongue portion 36 which is seated between the frame and the backing strip 27, and a foot portion 38 which seats snugly against the panel 25. It will be noted that the tongue portion has its edge 37 rounded to facilitate assembly of the dam with the panel. An inspection of Fig. 5 shows that, as it comes from the mold, the face 40 of the tongue portion 36 and the face 41 of the foot portion 38 form a definite obtuse angle or concavity with each other. By reason of this arrangement, the foot portion 38 of the dam is urged by the resilient nature of the dam into very close engagement with the panel 25 and, by reason of such engagement, the panel is securely retained in position against the backing strip 27 and the passage of moisture, dirt, etc. is effectively inhibited. The outer face 39 of the dam is substantially circular in cross section.

The mounting of a panel in the frame is very simple. The backing strip 27 is first seated in the retaining member 13, as seen in Fig. 5, and the panel 25 is then inserted through the opening 12 and placed in its proper position. The dam 30 is then applied, the tongue 36 being urged by a suitable blunt tool into the space between the frame and the backing strip so that the rim R of the frame seats in the groove 33 of the dam, as seen in Figs. 3 and 4. Should the panel be broken, it is a relatively simple task to remove the dam and the broken panel and then mount a new panel in the manner described above.

It will be seen from the above description that I have provided a greatly improved arrangement for mounting a panel, and especially a glass panel in a moving vehicle which is subject to great vibration, such as an autobus or the like. The mounting of the panel according to my invention is a simple task, and after it is mounted it is very secure and substantially proof against vibration and consequent injury. The groove 33 in the dam 30 is of such design that it will be securely retained on the rim portion R of the frame 10, and its seat on the frame is further insured by the resilient pressure caused by the angular relation of the faces 40 and 41. Furthermore, it is advantageous that my dam has a substantially circular surface 39 in cross section, inasmuch as such a surface is convenient to mold and furthermore provides a maximum body where it is desired, i. e., between the edge of the panel and a point on the surface 39 opposite the edge, while providing a thin taper in the lip 35 and in the foot 38, which greatly facilitates assembly.

Various changes and modifications coming within the scope of my invention may suggest themselves to those familiar with the art and hence I do not intend to be limited to the specific details disclosed herein or uses mentioned except to the extent indicated in the appended claims, which are to be interpreted as broadly as the state of the art will permit.

I claim:

1. A dam suitable for mounting a panel and especially adapted for use in a moving vehicle, comprising a strip of resilient non-metallic material having a flat surface and having a substantially non-tapered groove therein for the reception of a plate, said groove lying substantially parallel to said surface, the surface of said dam adjacent the entrance to said groove receding away from said groove in order to facilitate assembly of the dam with a plate entering said groove, and having a flat surface continuous with said first mentioned flat surface and forming an obtuse angle therewith, said dam being capable of resilient distortion to permit said flat surfaces to lie in substantially the same plane and thus exert pressure against a contiguous surface or surfaces.

2. A dam suitable for mounting a panel and especially adapted for use in a moving vehicle, comprising a strip of resilient non-metallic material having a flat surface and having a groove of substantially uniform width from top to bottom therein for the reception of a plate, said groove being substantially parallel to said surface, said dam having its maximum thickness along the bottom of said groove and tapering in both directions therefrom to form substantially wedge shaped flexible portions, and having a flat surface continuous with said first mentioned flat surface and forming an obtuse angle therewith, said dam being capable of resilient distortion to permit said flat surfaces to lie in substantially the same plane and thus exert pressure against a contiguous surface or surfaces.

3. A dam suitable for mounting a panel and especially adapted for use in a moving vehicle, comprising a strip of resilient non-metallic material having a pair of substantially flat faces adjoining and disposed at an obtuse angle to each other and having a relatively deep groove of substantially uniform width therein for the reception of a plate, said groove being substantially parallel to one of said flat faces, said dam having its maximum thickness along the juncture of said flat surfaces and tapering from said juncture in both directions along substantially a circular arc to form substantially wedge shaped flexible portions.

4. A dam suitable for mounting a panel and especially adapted for use in a moving vehicle, comprising a strip of resilient non-metallic material having a pair of continuous flat faces arranged at an obtuse angle with each other, said dam being adapted to be distorted to permit said faces to seat against a substantially flat uniplanar surface, and having a convex surface, substantially joining the extremities of said faces, and having a groove of substantially uniform width for the reception of a plate, said groove being substantially parallel to one of said faces.

5. In combination, a frame having an opening therein, a substantially non-yieldable retaining strip secured to one side of said frame and defining a channel therewith, said strip comprising an angular member having one leg extending away from said frame and another leg extending substantially parallel to said frame and inwardly of the edge thereof, a panel disposed within the opening of said frame, said panel being of approximately the same size as said opening, the marginal portion of the frame being substantially parallel to said panel, resilient means underlying the edge of said panel and backing said panel, and a dam formed of resilient non-metallic material having a groove seating the marginal portion of said frame and having a face engaging the marginal portion of said panel and having a portion substantially occupying the space between the marginal portion of said frame and the resilient member underlying the edge of said panel.

NICHOLAS L. WILLER.